(12) United States Patent
Yoo et al.

(10) Patent No.: US 8,137,889 B2
(45) Date of Patent: Mar. 20, 2012

(54) SOLVENT FOR PRINTING, PATTERN COMPOSITION FOR PRINTING COMPRISING THE SOLVENT, AND PATTERNING METHOD USING THE COMPOSITION

(75) Inventors: Hong Suk Yoo, Gunpo-si (KR); Chul Ho Kim, Incheon (KR); Jung Jae Lee, Gwacheon-si (KR); Tae Young Oh, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 93 days.

(21) Appl. No.: 11/319,302

(22) Filed: Dec. 27, 2005

(65) Prior Publication Data

US 2007/0009835 A1  Jan. 11, 2007

(30) Foreign Application Priority Data

Jun. 30, 2005 (KR) ........................ 10-2005-0057603

(51) Int. Cl.
*G03F 7/004* (2006.01)
*G03F 7/033* (2006.01)

(52) U.S. Cl. ................... 430/270.1; 430/287.1; 430/910

(58) Field of Classification Search ............... 430/270.1, 430/281.1, 285.1, 287.1, 908, 910
See application file for complete search history.

(56) References Cited

U.S. PATENT DOCUMENTS

| | | | | |
|---|---|---|---|---|
| 3,615,630 A * | 10/1971 | Dietrich | 430/270.1 |
| 3,622,362 A * | 11/1971 | Coney et al. | 536/68 |
| 3,629,104 A * | 12/1971 | Maddox, Jr. | 507/243 |
| 3,644,118 A * | 2/1972 | Agnihotri | 430/190 |
| 3,864,402 A * | 2/1975 | Swanson et al. | 564/497 |
| 3,869,262 A * | 3/1975 | Mayerhoffer et al. | 44/402 |
| 4,102,946 A * | 7/1978 | Imura et al. | 525/59 |
| 4,234,675 A * | 11/1980 | Kuznetsov | 430/271.1 |
| 4,810,618 A * | 3/1989 | Koike et al. | 430/281.1 |
| 4,917,988 A * | 4/1990 | Koizumi et al. | 430/169 |
| 5,176,985 A * | 1/1993 | Seitz et al. | 430/284.1 |
| 5,290,604 A * | 3/1994 | Nielsen | 427/427.6 |
| 5,453,464 A * | 9/1995 | Witzeman et al. | 525/153 |
| 5,521,052 A * | 5/1996 | Rahman et al. | 430/270.1 |
| 5,569,541 A * | 10/1996 | Kimura et al. | 428/520 |
| 5,700,609 A * | 12/1997 | Matsuda et al. | 430/27 |
| 5,776,575 A * | 7/1998 | Hiraoka et al. | 428/64.1 |
| 5,916,861 A * | 6/1999 | Lyssy | 510/213 |
| 5,922,122 A * | 7/1999 | Takeda et al. | 106/493 |
| 6,100,004 A * | 8/2000 | Elsaesser et al. | 430/176 |
| 6,193,843 B1 * | 2/2001 | Tsai et al. | 162/175 |
| 6,255,034 B1 * | 7/2001 | Shimada et al. | 430/281.1 |
| 6,270,751 B1 * | 8/2001 | Resler | 424/61 |
| 6,364,544 B1 * | 4/2002 | Sasayama et al. | 396/578 |
| 6,406,829 B1 * | 6/2002 | Tachikawa et al. | 430/270.1 |
| 6,756,165 B2 * | 6/2004 | Nishimura et al. | 430/11 |
| 6,806,022 B1 * | 10/2004 | Kawabe et al. | 430/270.1 |
| 2001/0045178 A1 * | 11/2001 | Shirakawa et al. | 106/493 |
| 2002/0142244 A1 * | 10/2002 | Takashima et al. | 430/138 |
| 2003/0073015 A1 * | 4/2003 | Tamoto et al. | 430/66 |
| 2004/0023152 A1 * | 2/2004 | Feiring et al. | 430/270.1 |
| 2004/0044127 A1 * | 3/2004 | Okubo et al. | 525/54.3 |
| 2004/0068061 A1 * | 4/2004 | Kawate et al. | 525/530 |
| 2004/0241450 A1 * | 12/2004 | Ogawa et al. | 428/412 |
| 2005/0064307 A1 * | 3/2005 | Fujimori | 430/7 |
| 2005/0241532 A1 * | 11/2005 | Feldhues et al. | 106/496 |
| 2006/0020068 A1 * | 1/2006 | Elce et al. | 524/356 |
| 2007/0065748 A1 * | 3/2007 | Hada et al. | 430/270.1 |
| 2007/0212479 A1 * | 9/2007 | Fiori et al. | 427/140 |

FOREIGN PATENT DOCUMENTS

| | | | |
|---|---|---|---|
| JP | 2005-181859 | * | 7/2005 |
| WO | WO 2004/074930 | * | 9/2004 |
| WO | WO 2004/108780 | * | 12/2004 |

OTHER PUBLICATIONS

DISPERBYK Data Sheet, BYK USA Inc., issued Mar. 2010.*

* cited by examiner

*Primary Examiner* — Anca Eoff
(74) *Attorney, Agent, or Firm* — Brinks Hofer Gilson & Lione

(57) ABSTRACT

Disclosed is a solvent for printing which comprises a first solvent selected from the group consisting of acetone, methyl ethyl ketone, methyl acetate, ethyl acetate, methanol and mixtures thereof, and a second solvent selected from the group consisting of propylene glycol monomethyl ether acetate (PGMEA), propylene glycol monomethyl ether (PGME), isopropanol, butyl acetate, ethyl-3-ethoxypropionate and mixtures thereof. Further disclosed are a pattern composition for printing comprising the solvent for printing, and a patterning method using the composition. The use of the solvent for printing enables formation of an accurate pattern.

7 Claims, 8 Drawing Sheets

SOLVENT FOR PRINTING, PATTERN COMPOSITION FOR PRINTING COMPRISING THE SOLVENT, AND PATTERNING METHOD USING THE COMPOSITION

This application claims the benefit of Korean Patent Application No. 10-2005-0057603, filed on Jun. 30, 2005, which is hereby incorporated by reference as if fully set forth herein.

BACKGROUND OF THE INVENTION

1. Field of the Invention

The present invention relates to a printing method for forming a pattern of a liquid crystal display and, more specifically, to a solvent for printing.

2. Discussion of the Related Art

Ultra-thin flat panel displays include a display screen with a thickness of not more than a few centimeters. Of these, liquid crystal displays are currently used in a wide range of applications, such as notebook computers, monitors, spacecrafts, and aircrafts, in terms of advantages of low power consumption due to low operating voltage and ease of portability.

Such liquid crystal displays include a lower substrate, an upper substrate, and a liquid crystal layer interposed between the two substrates. Generally, thin film transistors and pixel electrodes are formed on the lower substrate, and a light-blocking layer, a color filter layer and a common electrode are formed on the upper substrate.

That is, liquid crystal displays include various constituent elements, and a number of processing steps are repeated to form the constituent elements. Particularly, photolithography has been employed to pattern the constituent elements into various shapes.

However, since photolithography requires the use of a patterned mask and a light irradiation apparatus, it has the disadvantage of increased fabrication costs. In addition, since photolithography involves light exposure and development processes, it is disadvantageous in terms of complicated processing procedure and long processing time.

Thus, there exists a need for a novel patterning method for overcoming the disadvantages of photolithography. Printing has been introduced to satisfy the need.

Printing is a process wherein a pattern composition is applied to a printing roll to form a desired pattern and then the pattern is transferred to a substrate by rotating the roll to accomplish the formation of the pattern on the substrate.

Such printing process is simple and economically advantageous when compared to conventional photolithography processes. Hereinafter, a conventional printing process will be explained in more detail with reference to the accompanying drawings.

FIGS. 1a to 1c are process diagrams schematically showing the procedure of a conventional patterning method by printing.

First, as shown in FIG. 1a, a pattern composition 20 is applied to a blanket 35 attached to a printing roll 30 through a printing nozzle 10.

The blanket 35 is required to have firm attachment to the printing roll 30 and no deformation during printing. As a material for the blanket satisfying these requirements, a Si-based resin is widely used.

Then, as shown in FIG. 1b, the printing roll 30 is rotated on a printing plate 40 having protrusions 45 with a predetermined shape to transfer a portion 20a of the pattern composition 20 to the protrusions 45 of the printing plate 40. A residual portion of the pattern composition leaves a pattern 20b having a predetermined shape on the blanket 35 of the printing roll 30.

Then, as shown in FIG. 1c, the printing roll 30 is rotated on a substrate 50 to transfer the pattern 20b to the substrate 50, completing formation of the desired pattern.

To sum up, the conventional printing process is carried out by applying the pattern composition 20 to the blanket 35 attached to the printing roll 30 and sequentially transferring the applied pattern composition 20 to the printing plate 40 and the substrate 50 to form a pattern. The characteristics of the pattern composition 20 determine whether the application and transfer steps are well performed or not.

That is, the pattern composition is a solution of a pattern material (for example, a BM material or a pigment for a color filter) in a solvent. Failure in the selection of an optimum solvent leads to inaccurate control of the application and transfer steps, making it impossible to form a fine pattern. The reasons will be explained in more detail below.

Firstly, when the pattern composition 20 is non-uniformly applied to the blanket 35 of the printing roll 30 in the application step shown in FIG. 1a, accurate pattern formation is not ensured.

Secondly, when the pattern composition 20 applied to the blanket 35 after the application step shown in FIG. 1a is not dried within a short time (i.e. when a solvent contained in the pattern composition is not evaporated within a short time), the transfer of the pattern composition 20 is poorly performed, leading to formation of an inaccurate pattern.

FIG. 2a shows the occurrence of defects during transfer in the case where the pattern composition 20 applied to the blanket 35 is not dried within a short time. As is evident from region "A" shown in FIG. 2a, the undried pattern composition 20 is not completely transferred to the printing plate 40 and hence accurate pattern formation is not achieved.

Thirdly, when the pattern composition 20 applied to the blanket 35 after the application step shown in FIG. 1a is excessively dried (i.e. when an excess amount of the solvent is evaporated from the pattern composition 20 to increase the viscosity of the pattern composition to a specified level or higher), the transfer of the pattern composition 20 is poorly performed in the transfer steps shown in FIGS. 1b and 1c, which leads to formation of an inaccurate pattern.

FIG. 2b shows the occurrence of defects during transfer in the case where the pattern composition 20 applied to the blanket 35 is excessively dried. As is evident from region "B" shown in FIG. 2b, when the viscosity of the pattern composition 20 is increased to a specified level or higher, the pattern composition 20 may be transferred to unwanted regions and hence accurate pattern formation is not achieved.

Fourthly, when the blanket 35 is dissolved in a solvent present in the pattern composition 20 after the application step shown in FIG. 1a, swelling of the blanket 35 occurs, leading to formation of an inaccurate pattern.

As explained above, the problems caused in the application and transfer steps of the printing process are attributed to the pattern composition 20, particularly, the solvent contained in the pattern composition for printing. Consequently, selection of an optimum solvent is essential in the formation of an accurate pattern.

Until now, however, no solvent has been developed that can overcome the above problems.

SUMMARY OF THE INVENTION

Accordingly, the present invention is directed to a solvent composition for printing, a pattern composition for printing comprising the solvent composition, and a patterning method using the pattern composition that substantially obviates one or more problems due to limitations and disadvantages of the related art.

Additional advantages and features of the invention will be set forth in part in the description which follows and in part will become apparent to those having ordinary skill in the art upon examination of the following or may be learned from practice of the invention. The other advantages of the invention may be realized and attained by the structure particularly pointed out in the written description and claims hereof as well as the appended drawings.

To achieve these and other advantages and in accordance with the purpose of the invention, as embodied and broadly described herein, a solvent composition for printing comprises a first solvent selected from the group consisting of acetone, methyl ethyl ketone, methyl acetate, ethyl acetate, methanol and mixtures thereof, and a second solvent selected from the group consisting of propylene glycol monomethyl ether acetate (PGMEA), propylene glycol monomethyl ether (PGME), isopropanol, butyl acetate, ethyl-3-ethoxypropionate and mixtures thereof.

In another aspect of the present invention, a pattern composition for printing comprises a pattern material, a solvent composition, a dispersant, and a binder. The solvent composition comprises a first solvent selected from the group consisting of acetone, methyl ethyl ketone, methyl acetate, ethyl acetate, methanol, and mixtures thereof, and a second solvent selected from the group consisting of propylene glycol monomethyl ether acetate (PGMEA), propylene glycol monomethyl ether (PGME), isopropanol, butyl acetate, ethyl-3-ethoxypropionate, and mixtures thereof.

In yet another aspect of the present invention, a patterning method comprises the steps of applying the pattern composition for printing on a blanket attached to a printing roll to form a pattern having a predetermined shape, and rotating the printing roll on a substrate to transfer the pattern to the substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
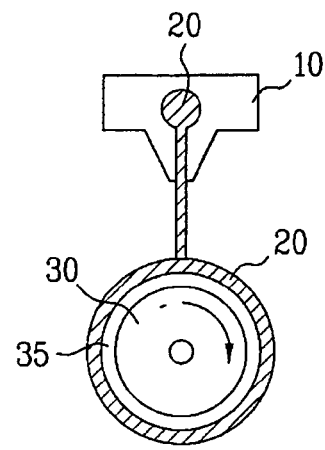
FIGS. 1a to 1c are process diagrams schematically showing the procedure of a conventional patterning method by printing.
Figure 1B:
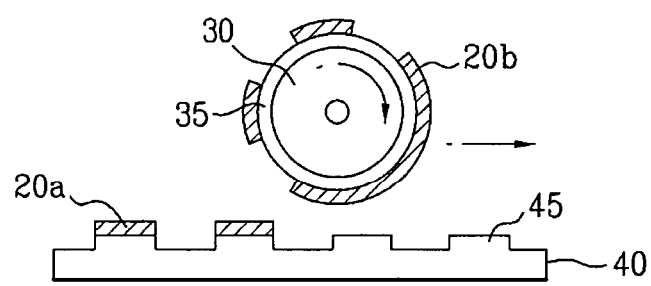
Figure 1C:
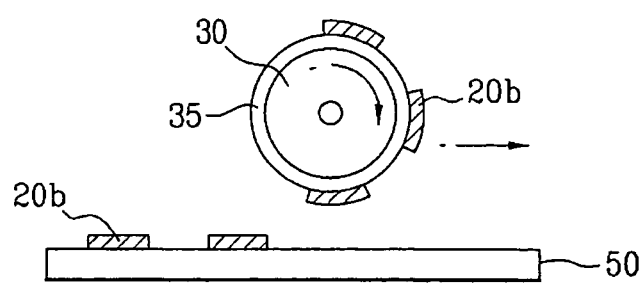
Figure 2A:
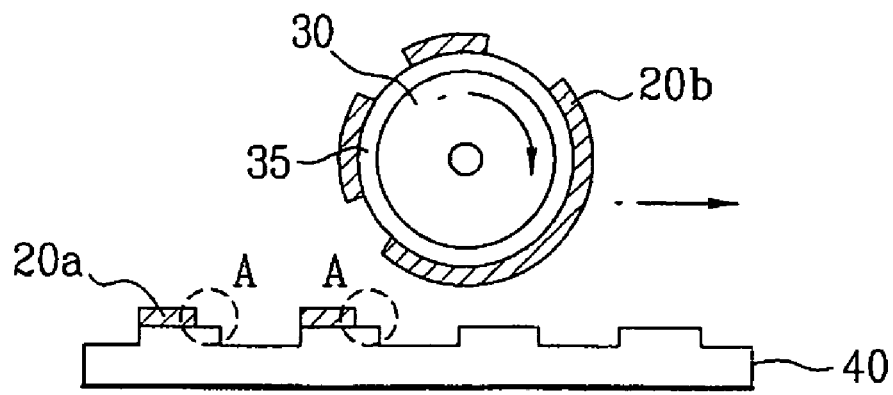
FIGS. 2a and 2b are schematic diagrams illustrating problems of a conventional printing method.
Figure 2B:
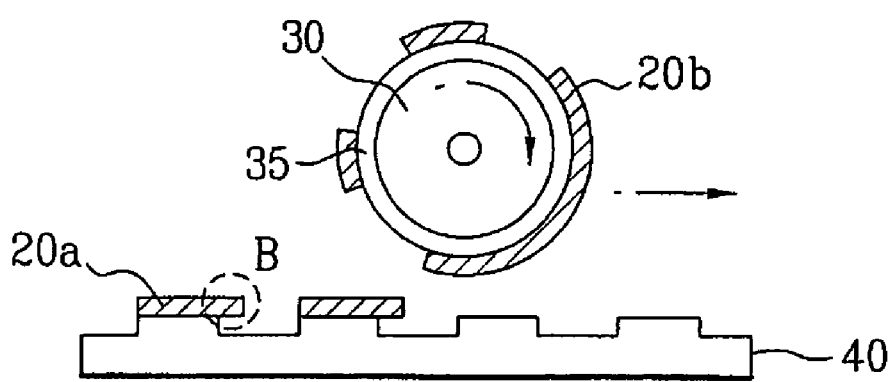

Reference will now be made in detail to the preferred embodiments of the present invention, examples of which are illustrated in the accompanying drawings. Wherever possible, the same reference numbers will be used throughout the drawings to refer to the same or like parts.

1. Solvent for Printing

Although not wishing to be bound by any particular theory, the inventor has conducted research on optimum solvents capable of solving the above-mentioned problems, and as a result, has found that a preferred optimum solvent should ideally satisfy the following requirements.

In connection with the first problem, a pattern composition comprising the solvent should be capable of being uniformly applied to a blanket of a printing roll. To meet this requirement, the contact angle between the solvent and the blanket should be small. Accordingly, in one embodiment it is preferred that the contact angle be 45° or smaller.

In connection with the second problem, the pattern composition should be capable of being dried within a short time after application to the blanket of the printing roll. To meet this requirement, in one embodiment, a large portion of the solvent should be evaporated within a short time after application.

In connection with the third problem, the viscosity of the pattern composition should be capable of being maintained at a constant level after application to the blanket of the printing roll. To meet this requirement, in one embodiment, the solvent should not be dried for a given time after application.

The concept of the second problem is contradictory to that of the third problem. This means that a large portion of the solvent should be capable of being dried within a short time at first, but thereafter, the remaining solvent should be capable of being maintained undried for a given time. More specifically, taking into account the printing process, 90% of the solvent should be capable of being evaporated within about one second after application, and thereafter the viscosity of the remaining solvent should be capable of being maintained at about 10,000 cp for about 100 seconds after application.

Thus, the present invention has been made in view of both the second and third problems. The solvent composition for printing according to the present invention comprises a first solvent capable of being evaporated within a short time and a second solvent capable of being maintained at a constant level for a given time without being evaporated.

In connection with the fourth problem, the solvent must not substantially dissolve the blanket. To meet this requirement, it is preferred that solvents having a solubility parameter similar to that (7) of a Si-based resin used as a material for the blanket be excluded. More specifically, the solvent should have a solubility parameter not lower than 8.5 at which the rate of change in the volume of the blanket can be maintained at 25% or less. In conclusion, the solvent for printing comprising the first and second solvents according to the present invention is preferably capable of satisfying all the above-mentioned requirements.

Accordingly, a solvent composition for printing according to the present invention includes a first solvent and a second solvent. Each of the first and second solvents will be explained below.

(1) First Solvent

The first solvent is preferably capable of satisfying the first, second and fourth requirements. Specifically, as the first solvent, preferred is a solvent having the following characteristics.

In connection with the first requirement, preferred is a solvent having a contact angle with a blanket of 40° or lower.

In connection with the second requirement, preferred is a solvent having a solid content of 90% or more within one second after application and a boiling point of 80° C. or lower.

In connection with the fourth requirement, preferred is a solvent having a solubility parameter of 9 or higher. In this case, the rate of change in the volume of a blanket can be decreased to 25% or less.

As the first solvent satisfying the above characteristics, acetone, methyl ethyl ketone, methyl acetate, ethyl acetate, methanol, or a mixture thereof is preferably used.

In connection with the above requirements, characteristics of the respective constituent solvents are summarized in Table 1.

TABLE 1

| | Contact angle between blanket | Solid content within one second after application | Boiling point | Solubility parameter | Rate of change in volume |
|---|---|---|---|---|---|
| Acetone | 38° | ≧95% | 56° C. | 9.68 | 22% |
| Methyl ethyl ketone | 37° | ≧93% | 80° C. | 9.22 | 24% |
| Methyl acetate | 36° | ≧90% | 56.9° C. | 9.5 | 22% |
| Ethyl acetate | 36° | ≧92% | 77.11° C. | 9.1 | 25% |
| Methanol | 34° | ≧92% | 64.5° C. | 14.5 | 18% |

(2) Second Solvent

The second solvent satisfies the first, third and fourth requirements. Specifically, as the second solvent, preferred is a solvent having the following characteristics.

In connection with the first requirement, preferred is a solvent having a contact angle with a blanket of 45° or lower.

In connection with the third requirement, preferred is a solvent that is not evaporated within 100 seconds after application and has a boiling point not lower than 80° C.

In connection with the fourth requirement, preferred is a solvent having a solubility parameter of 10 or higher. In this case, the rate of change in the volume of a blanket can be decreased to 15% or less.

As the second solvent satisfying the above characteristics, propylene glycol monomethyl ether acetate (PGMEA), propylene glycol monomethyl ether (PGME), isopropanol, butyl acetate, ethyl-3-ethoxypropionate, or a mixture thereof is preferably used.

In connection with the above requirements, characteristics of the respective constituent solvents are summarized in Table 2.

TABLE 2

| | Contact angle between blanket | Boiling point | Solubility parameter | Rate of change in volume |
|---|---|---|---|---|
| PGMEA | 43° | 145° C. | 10 | 15% |
| PGME | 45° | 132° C. | 12.8 | 8% |
| Isopropanol | 44° | 82° C. | 11.5 | 6% |
| Butyl acetate | 42° | 126.06° C. | 10 | 15% |
| Ethyl-3-ethoxypropionate | 42° | 166° C. | 10 | 14% |

(3) Composition of First Solvent and Second Solvent

To simultaneously solve the second and third problems, the solvent composition for printing according to the present invention preferably comprises about 40 to about 70 parts by weight of the first solvent and about 20 to about 50 parts by weight of the second solvent.

2. Pattern Composition for Printing

A pattern composition for printing according to the present invention comprises a pattern material, a solvent for printing, a dispersant, and a binder.

The pattern material is a BM material or a pigment for a color filter. Any material may be used as the pattern material so long as it is a constituent element of a pattern composition capable of being formed by printing.

The solvent composition for printing used herein is the same as that described in the previous embodiment, and thus detailed description thereof is omitted.

The dispersant is added to better disperse the pattern material in the solvent for printing. As the dispersant, a polycarboxylic acid-based polymeric material is preferred.

The binder is preferably selected from the group consisting of acrylate-based polymeric material, ester-based polymeric material, and melamine-based polymeric material, and is more preferably selected from compounds of Formulae 1 to 5 below:

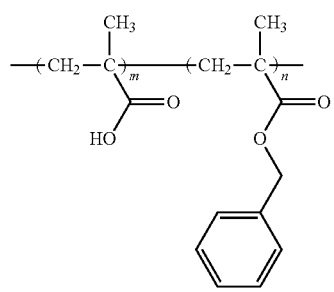

Formula 1

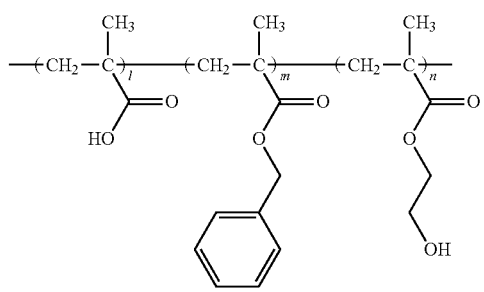

Formula 2

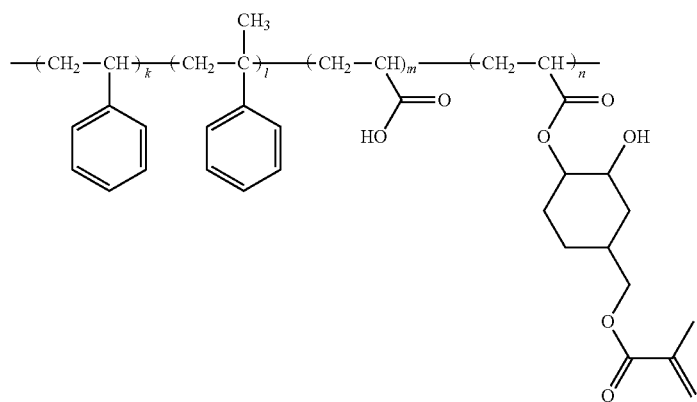

Formula 3

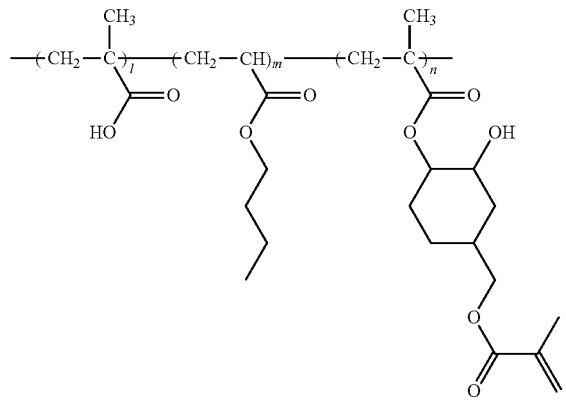

Formula 4

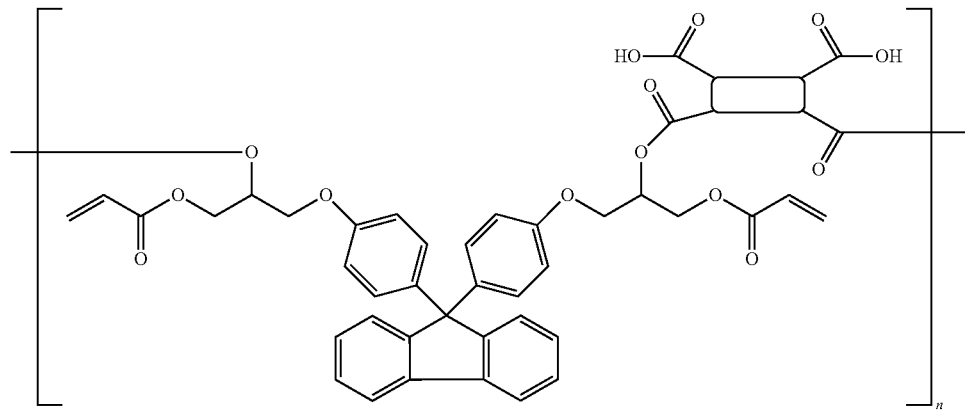

Formula 5

(wherein k, l, m and n are each independently an integer of 1 or more).

The pattern composition for printing according to the present invention preferably comprises about 10 to about 30 parts by weight of the pattern material, about 70 to about 90 parts by weight of the solvent composition for printing, about 5 to about 15 parts by weight of the dispersant, and about 5 to about 15 parts by weight of the binder.

In addition to these constituent ingredients, the pattern composition for printing according to the present invention may further comprise an additive.

The additive is preferably at least one agent selected from the group consisting of surfactants, adhesion promoters, dissolution-control agents, curing promoters, polymerization initiators, and antioxidants.

Examples of suitable surfactants include, but are not limited to, silonic acid derivatives and fluorinated compounds.

Examples of suitable adhesion promoters include, but are not limited to, alkyl siloxane.

Examples of suitable dissolution-control agents include, but are not limited to, dissolution promoters and dissolution initiators known in the art.

Curing promoters, polymerization initiators and antioxidants that can be used in the present invention include all known materials.

The additive is preferably present in an amount of 1~10 parts by weight in the pattern composition for printing according to the present invention.

3. Method for Forming Pattern

Figure 3A:
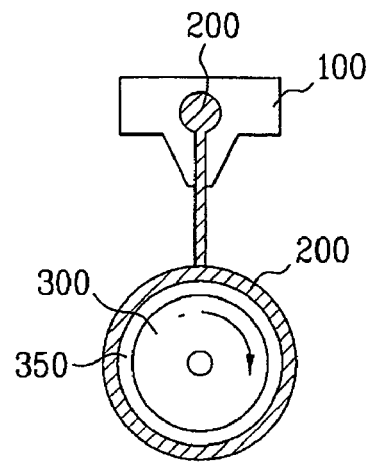
FIGS. 3a to 3c are process diagrams schematically showing the procedure of a patterning method according to a first embodiment of the present invention.
Figure 3B:
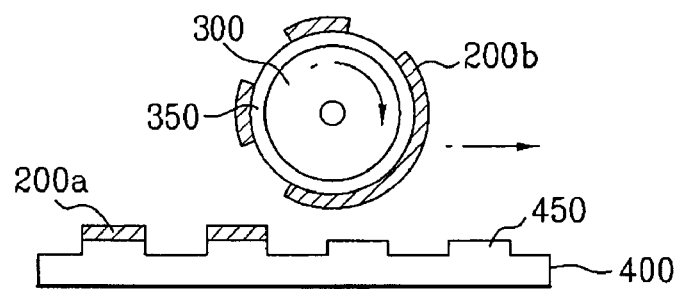
Figure 3C:
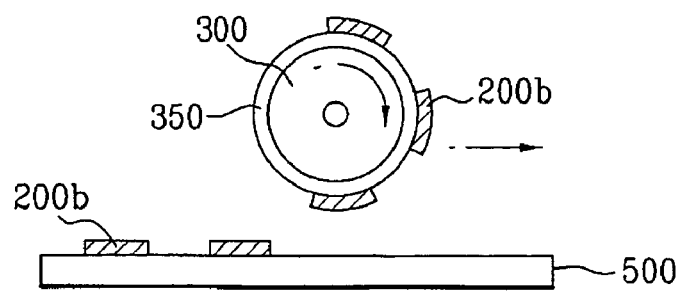

FIGS. 3a to 3c are process diagrams schematically showing the procedure of a patterning method according to a first embodiment of the present invention.

First, as shown in FIG. 3a, a pattern composition 200 is applied to a blanket 350 attached to a printing roll 300 through a printing nozzle 100.

The pattern composition 200 used herein is the same as that described previously, and thus detailed explanation thereof is omitted.

The blanket 350 may be made of a Si-based resin.

Then, as shown in FIG. 3b, the printing roll 300 is rotated on a printing plate 400 having protrusions 450 with a predetermined shape to transfer a portion 200a of the pattern composition to the protrusions 450 of the printing plate 400. A residual portion of the pattern composition leaves a pattern 200b having a predetermined shape on the blanket 350 of the printing roll 300.

Then, as shown in FIG. 3c, the printing roll 300 is rotated on a substrate 500 to transfer the pattern 200b on the substrate 500, completing formation of the desired pattern.

Figure 4A:
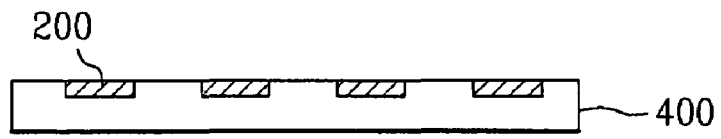
FIGS. 4a to 4c are process diagrams schematically showing the procedure of a patterning method according to a second embodiment of the present invention.
Figure 4B:
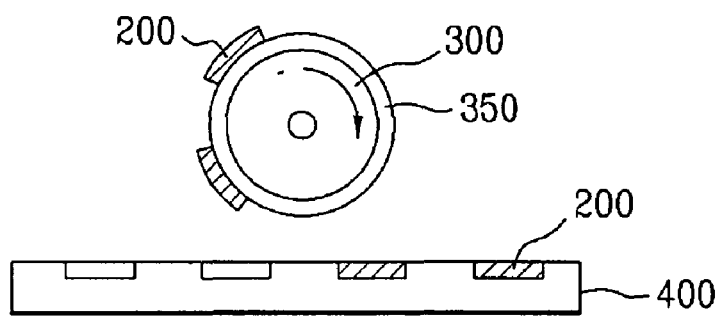
Figure 4C:
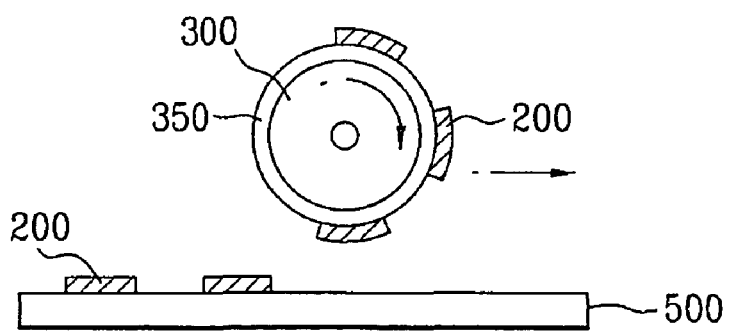

FIGS. 4a to 4c are process diagrams schematically showing the procedure of a patterning method according to a second embodiment of the present invention.

First, as shown in FIG. 4a, a pattern composition 200 is applied to depressions having a predetermined shape formed on a printing plate 400.

The pattern composition 200 used herein is the same as that described previously, and thus detailed explanation thereof is omitted.

Then, as shown in FIG. 4b, a printing roll 300 is rotated on the printing plate 400 to transfer the pattern composition 200 present in the depressions to a blanket 350 of the printing roll 300 to form a pattern 200 having a predetermined shape on the printing roll 300.

The blanket 350 may be made of a Si-based resin.

Then, as shown in FIG. 4c, the printing roll 300 is rotated on a substrate 500 to transfer the pattern on the substrate 500, completing formation of the desired pattern.

Figure 5A:
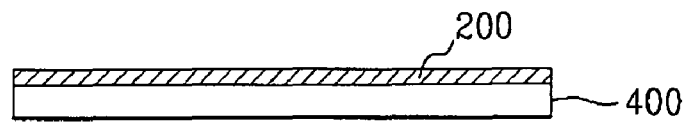
FIGS. 5a to 5c are process diagrams schematically showing the procedure of a patterning method according to a third embodiment of the present invention.
Figure 5B:
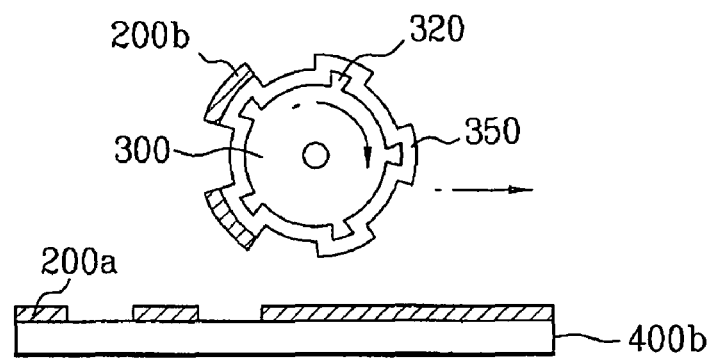
Figure 5C:
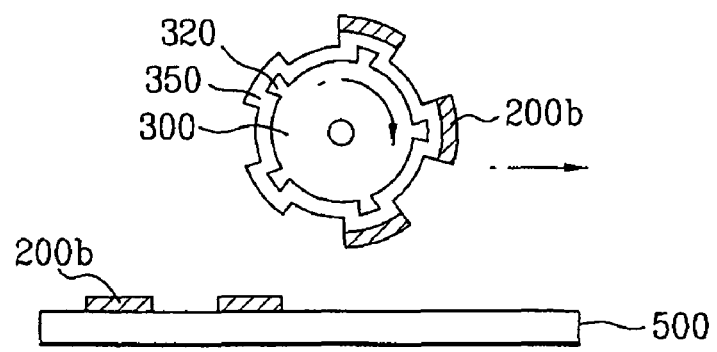

FIGS. 5a to 5c are process diagrams schematically showing the procedure of a patterning method according to a third embodiment of the present invention.

First, as shown in FIG. 5a, a pattern composition 200 is applied to a printing plate 400.

The pattern composition 200 used herein is the same as that described previously, and thus detailed explanation thereof is omitted.

Then, as shown in FIG. 5b, a printing roll 300 having protrusions 320 with a predetermined shape is rotated on the printing plate 400 on which the pattern composition 200 is formed to transfer the pattern composition 200b to the blanket 350 of the protrusions 320.

The blanket 350 may be made of a Si-based resin.

Then, as shown in FIG. 5c, the printing roll 300 is rotated on a substrate 500 to transfer the pattern 200b on the substrate 500, completing formation of the desired pattern.

The effects of the solvent composition for printing according to the present invention will be become apparent with reference to the following example and comparative example.

EXAMPLE 1

60 parts by weight of acetone as a first solvent and 40 parts by weight of PGMEA as a second solvent were mixed together to prepare a solvent for printing.

20 parts by weight of a pigment, 5 parts by weight of a dispersant (polycarboxylic acid) and 10 parts by weight of a binder (Formula 1) were mixed with 80 parts by weight of the solvent composition to prepare a pattern composition for printing.

Figure 6A:
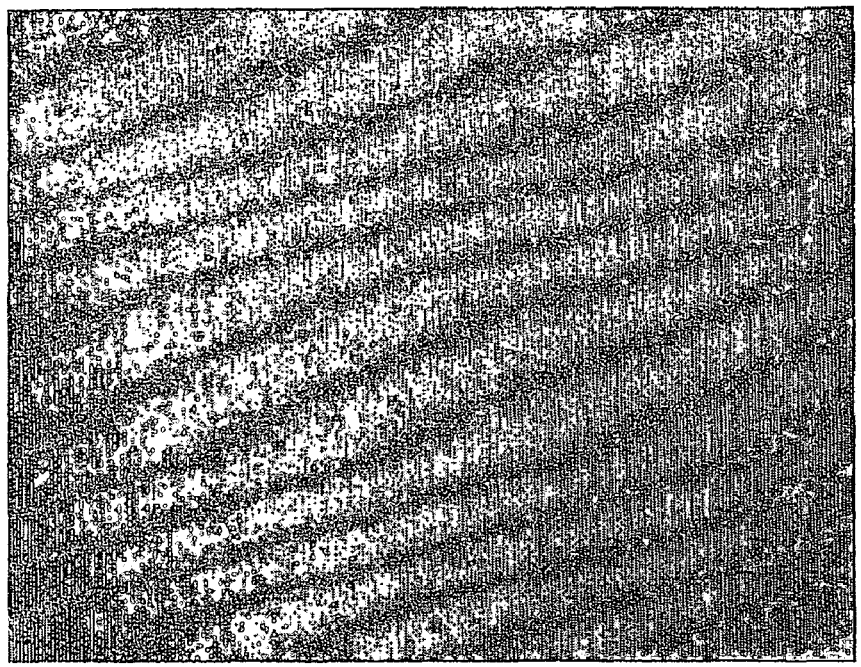
FIG. 6a is a photograph of a pattern composition for printing applied to a blanket in accordance with Example 1 of the present invention.

The pattern composition for printing was applied to the blanket 350 of the printing roll 300 in accordance with FIG. 3a. FIG. 6a is a photograph of the applied pattern composition for printing.

Figure 7A:
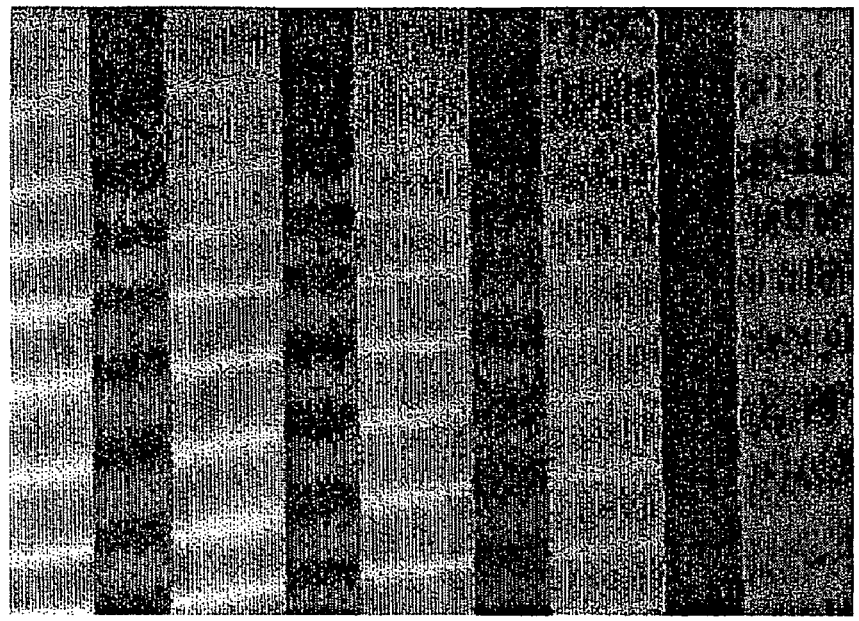
FIG. 7a is a photograph of a pattern formed on a substrate in accordance with Example 1 of the present invention.

A pattern was formed on the substrate 500 in accordance with FIGS. 3b and 3c. The pattern formation was performed about one second after the pattern composition for printing was applied to the blanket 350 of the printing roll 300. A photograph of the pattern thus formed is shown in FIG. 7a.

COMPARATIVE EXAMPLE 1

A pattern composition for printing was prepared in the same manner as in Example 1, except that PGMEA alone was used as a solvent for printing.

Figure 6B:
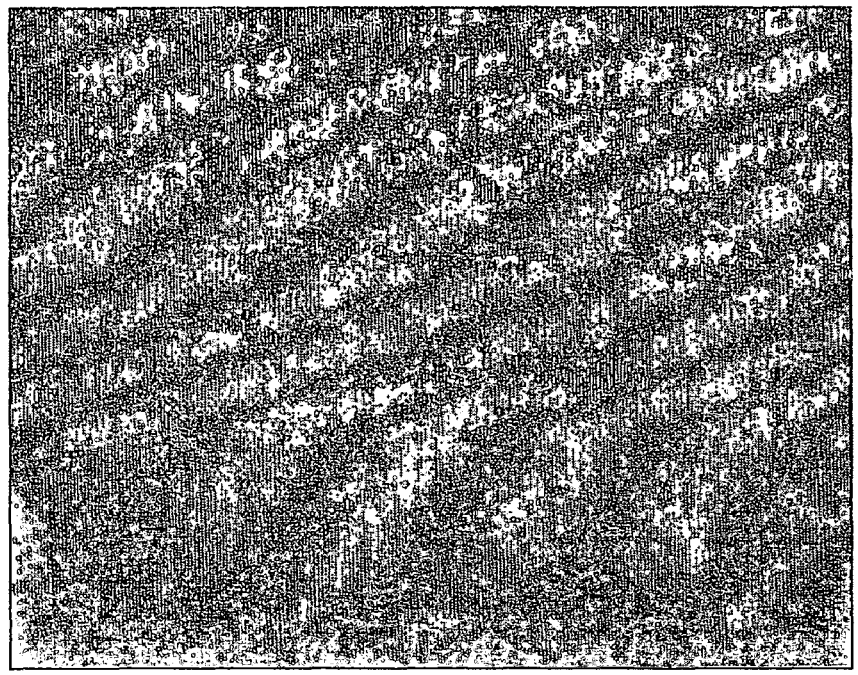
FIG. 6b is a photograph of a pattern composition for printing applied to a blanket in accordance with Comparative Example 1.

The pattern composition for printing was applied to the blanket 350 of the printing roll 300 in accordance with FIG. 3a. FIG. 6b is a photograph of the applied pattern composition for printing.

Figure 7B:
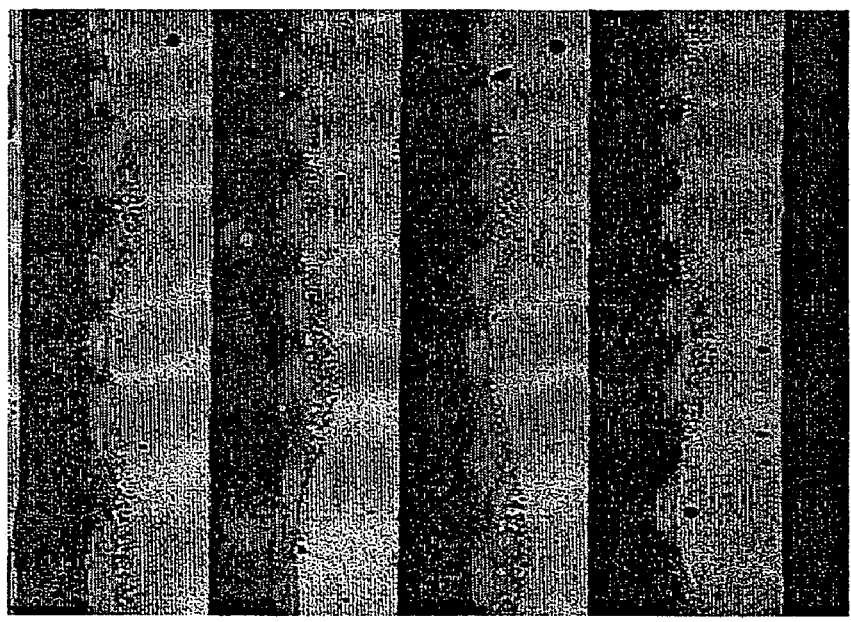
FIGS. 7b to 7d are photographs of patterns formed on substrates in accordance with Comparative Example 1.
Figure 7C:
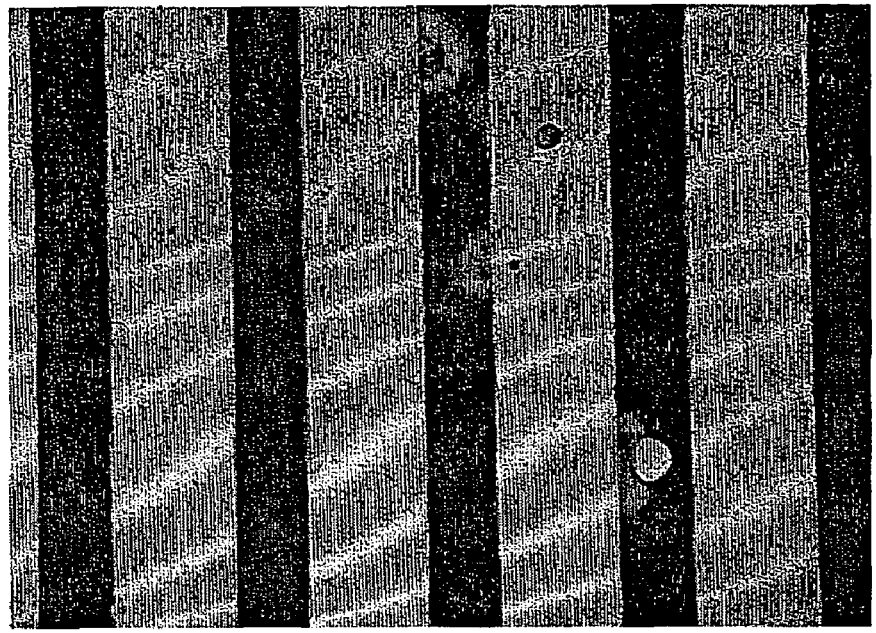
Figure 7D:
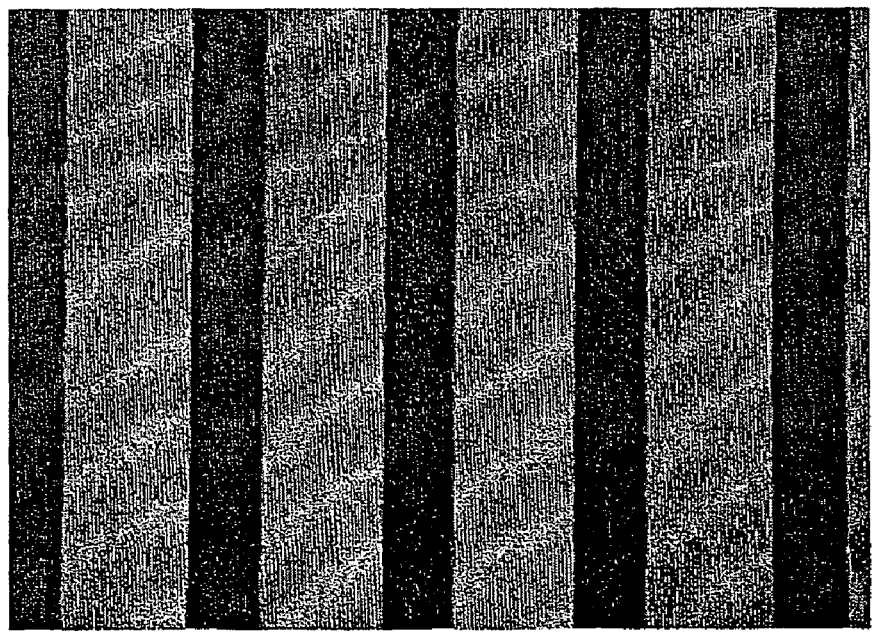

A pattern was formed on the substrate 500 in accordance with FIGS. 3b and 3c. The pattern formation was performed three times at about one second, one minute and five minutes after the pattern composition for printing was applied to the blanket 350 of the printing roll 300. Photographs of the patterns thus formed are shown in FIGS. 7b to 7d.

Results

As is evident from the photograph shown in FIG. 6a, the pattern composition for printing prepared in Example 1 is uniformly applied to the blanket. In contrast, the pattern composition for printing prepared in Comparative Example 1 is non-uniformly applied to the blanket (see, FIG. 6b).

As is evident from the photograph shown in FIG. 7a, an accurate pattern was formed within a short time (one second) after application in Example 1. In contrast, an accurate pattern was not formed until five minutes following the application in Comparative Example 1 (see, FIGS. 7b to 7d).

As apparent from the above description, the pattern composition for printing according to the present invention provides the following advantages.

Firstly, since the pattern composition for printing uses a solvent having a small contact angle with a blanket, it is uniformly applied to the blanket, enabling formation of an accurate pattern.

Secondly, since the pattern composition for printing uses a mixture of first and second solvents that is dried within a short time after application but thereafter is maintained without being dried for a given time, an accurate pattern can be formed.

Finally, since the pattern composition for printing uses a solvent having a solubility parameter different from that of a blanket, the rate of change in the volume of the blanket is decreased, enabling formation of an accurate pattern.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A pattern composition for printing comprising:
   a pattern material;
   a solvent composition consisting of about 40 to about 70 parts by weight of a first solvent and about 20 to about 50 parts by weight of a second solvent;
   a dispersant; and
   a binder;
   wherein the first solvent consists of methyl acetate;
   wherein the second solvent consists of a compound selected from propylene glycol monomethyl ether acetate (PGMEA), propylene glycol monomethyl ether (PGME), isopropanol, butyl acetate, ethyl-3-ethoxypropionate, and mixtures thereof; and
   wherein the binder comprises a compound selected from the group consisting of compounds of Formulae (1) to (5) below:

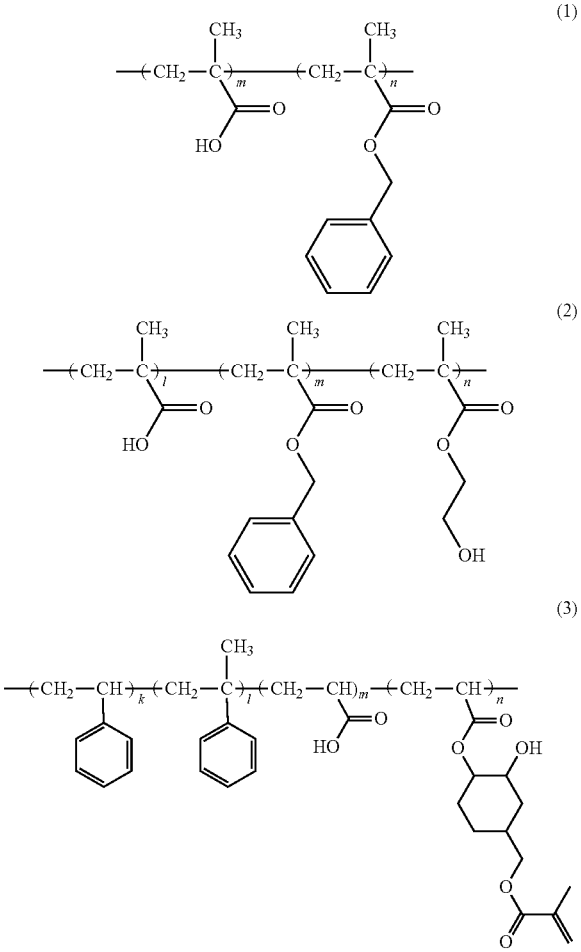

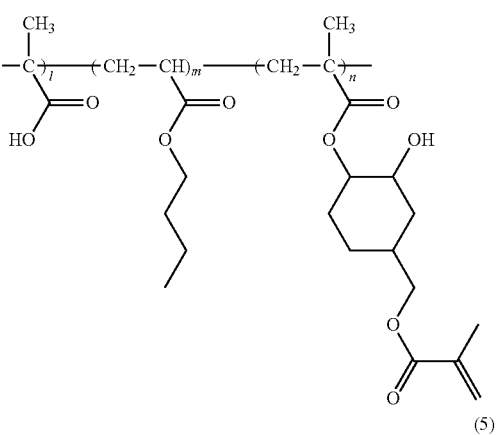

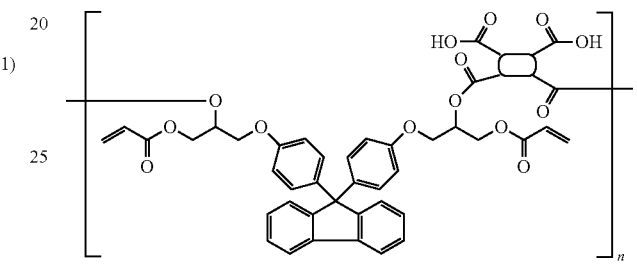

(wherein k, l, m and n are each independently an integer of 1 or more).

2. The pattern composition according to claim 1, wherein the dispersant comprises a polycarboxylic acid-based polymeric material.

3. The pattern composition according to claim 1, wherein the composition comprises about 10 to about 30 parts by weight of the pattern material, about 70 to about 90 parts by weight of the solvent composition, about 5 to about 15 parts by weight of the dispersant, and about 5 to about 15 parts by weight of the binder.

4. The pattern composition according to claim 1, further comprising an additive.

5. The pattern composition according to claim 4, wherein the additive comprises at least one agent selected from the group consisting of surfactants, adhesion promoters, dissolution-control agents, curing promoters, polymerization initiators, or antioxidants.

6. The pattern composition according to claim 4, wherein the additive is present in an amount of about 1 to about 10 parts by weight.

7. The pattern composition according to claim 1 comprising about 20 parts by weight pattern material, 5 parts by weight dispersant, 10 parts by weight binder, and 80 parts by weight solvent composition,
   wherein the pattern material is pigment and the dispersant is a polycarboxylic acid.

* * * * *